Aug. 19, 1969 P. L. VITKUS 3,462,321
PROCESS OF EPITAXIAL GROWTH OF SILICON CARBIDE
Filed Oct. 25, 1966
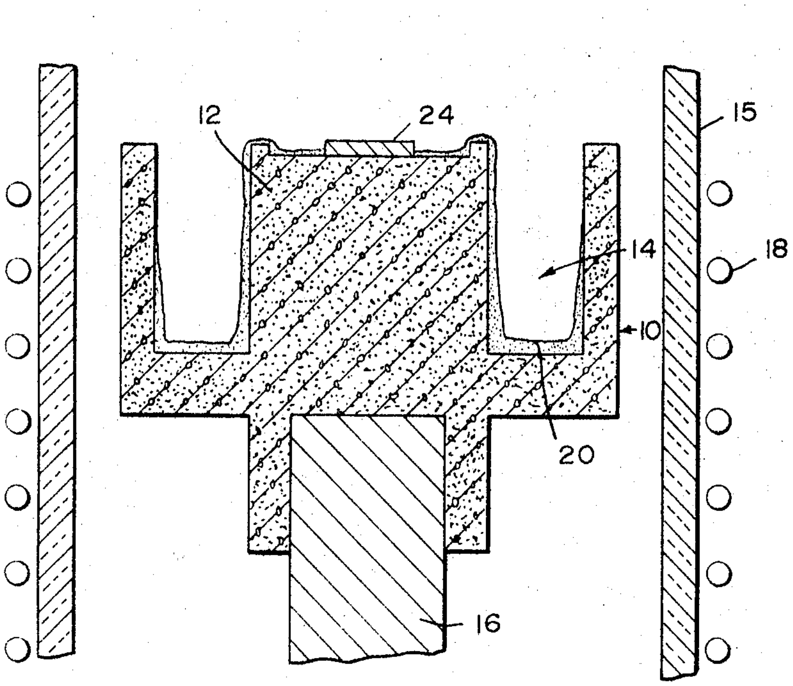

United States Patent Office 3,462,321

Patented Aug. 19, 1969

3,462,321

PROCESS OF EPITAXIAL GROWTH OF SILICON CARBIDE

Paul L. Vitkus, Bedford, Mass., assignor to National Research Corporation, Newton Highlands, Mass., a corporation of Massachusetts Continuation-in-part of application Ser. No. 545,751, Apr. 27, 1966. This application Oct. 25, 1966, Ser. No. 589,363

Int. Cl. H01l 7/38

U.S. Cl. 148—172 5 Claims

ABSTRACT OF THE DISCLOSURE

Method of growing a silicon carbide epitaxial layer on a silicon carbide seed which comprises; providing in a temperature gradient a silicon carbide seed and a source of carbon separated by a layer of molten silicon. Carbon from the carbon source, which is at the higher temperature, is dissolved in the silicon, and epitaxial deposition of silicon carbide takes place on the cooler surface of the seed. An impurity such as boron or aluminum may be included in the silicon layer to provide a doped epitaxial layer.

This invention relates to novel silicon carbide junction diodes, particularly light-emitting diodes and a novel method of manufacturing such diodes. This application, is, in part, a continuation of my copending application Ser. No. 545,751, filed Apr. 27, 1966, and now abandoned.

SUMMARY OF THE INVENTION

The invention is particularly concerned with silicon carbide junction diodes and their production, wherein a light-emitting junction is formed on an n-type crystal by growing a p-type layer on the surface of the crystal. The emitted light has a very narrow beam thickness so that the emitted light is particularly useful for recording sound on photographic film.

A silicon carbide junction diode can be employed as an electroluminescent light source. For the production of sound and other data records on photographic film, it is highly desirable that the light emitted from the diode have the narrowest possible thickness of beam and the highest possible intensity in the visible portion of the spectrum.

It is a principal object of the present invention to provide such diodes having extremely narrow thickness of light beam emitted therefrom with high output of visible light.

Another object of the invention is to provide improved methods of making diodes.

These and other objects of the invention will be obvious and will in part appear hereinafter.

For a fuller understanding of the nature and objects of the invention, reference should be had to the following detailed discussion thereof taken in connection with the accompanying drawing in which:

FIG. 1 is a diagrammatic, schematic representation of one embodiment of the invention.

In the general practice of the present invention, a silicon carbide junction is prepared by starting with a single crystal of silicon carbide having an "n" impurity type and growing a layer of silicon carbide containing a "p" impurity type onto one surface while the impurities interdiffuse. When the starting material is an n type silicon carbide crystal having a relatively high concentration of nitrogen, for example, it is green and translucent to visible light. If this diode is subjected to a diffusion-epitaxial growth treatment wherein a p type layer is grown on one surface of the crystal, a p-n junction will be formed. When the p regrown layer has a relatively high concentration of p type impurities (boron, for example), it will have a rather dark color and be quite opaque to visible light. Since this p layer is immediately adjacent to the p-n junction, where the light is generated in the operation of the diode as an electroluminescent light source, this light can escape from the junction in the plane of the junction. However, it can also escape through the translucent base n layer.

In order that the invention may be more fully understood, reference should be had to FIG. 1 and to the following nonlimiting examples:

Example 1

A small graphite crucible 10 was constructed from high purity graphite (less than 5 p.p.m. ash) obtained from the Ultra Carbon Corporation. The crucible had the general shape shown in FIG. 1. The pedestal 12 was about 7/16" in diameter and the groove 14 was about 3/8" deep. It was supported inside of a quartz tube 15 about 15" long and 1¼" in diameter by a carbon rod 16 about 8" long. On the outside of the tube 15 was positioned an induction coil 18 energized by a 10 kw. radio frequency generator.

The crucible was outgassed at 1500° C. for 10 minutes in hydrogen, flushed for 5 minutes in helium, then the temperature was increased to 1900° C. on top of the pedestal for 10 minutes. The system was then cooled and the crucible removed. One gram of silicon 20 was placed in the groove 14 with 100 mg. of pure crystalline boron. Some grains of the crystalline boron remained on top of the pedestal 12. The test crystal 24 containing 220 parts per million nitrogen was placed on top of the pedestal. The bottom surface of the crystal had been polished with ¼ micron diamond paste. Resistivity of the crystal was approximately .05 Ωcm. and the mobility approximately 70 $cm.^2/v.$-sec.

The crucible, with the crystal, was then replaced in the quartz tube 15. The crucible temperature was raised to 1300° C. in hydrogen for 10 minutes. The tube then was flushed with helium for five minutes. After flushing the helium gas flow was controlled at 1 cu. ft./hr. and the temperature raised to 1900° C. (on the surface of the crystal) for ¾ of an hour. The system was then cooled and the crystal removed from the crucible.

It was then processed in the following manner:

(1) The top surface of the crystal was ground to remove a dark layer which had grown on this top surface.

(2) The crystal was then contacted on both sides with a pure silver contact using $TiH_2$ as a flux in a helium atmosphere at 1000° C.

(3) The crystal was then trimmed to a small cube (.9 mm. on edge).

(4) Two sides were polished.

The quantum efficiency of light emanating from the diode was determined with a photomultiplier tube. In this case the quantum efficiency is calculated as the number of photons out divided by the number of electrons passing through the diode. The output of photons per second is found by measuring the light output of the diode with a photomultiplier using the published tube data, and the input of electrons per second is found by measuring the diode current and using the relationship $$1 \text{ amp} = 6.28 \times 10^{18}$$

electrons per second.

The final diced diode had an "n" section which was translucent green, the p-n junction had a regrown region about .0015" thick. When this diode was biased in the forward direction, it emitted strong yellow light having quantum efficiency of about $5 \times 10^{-6}$ in a narrow flat beam emanating from the junction.

Example 2

A second run was made similar to Example 1 except that 100 mg. of aluminum were used in place of the boron of Example 1. This resulted in a p-n junction having a dark "p" regrown layer about .002" thick. This diode also emitted a strong narrow yellow light beam from the plane of the junction.

In the above two runs, the regrown p layer is believed to have been formed by wetting action of the silicon on the carbon pedestal, this silicon containing the dissolved "p" type impurity (e.g. boron or aluminum). This wetting may be accompanied with the formation of considerable silicon carbide at the interface between the molten silicon and the carbon of the pedestal. In any case, it appears that silicon creeps between the lower face of the silicon carbide crystal and the upper face of the pedestal. A layer of molten silicon thus exists between a lower carbon (or silicon carbide) surface and a somewhat cooler upper silicon carbide surface. Under these conditions solution of carbon at the lower (hotter) boundary of the liquid layer takes place and deposition of silicon carbide at the upper (colder) boundary is accomplished. Since the growing silicon carbide comes from a silicon containing a high concentration of the p type impurity, the growing silicon carbide layer is a "p" type layer.

Since certain changes can be made in the above process without departing from the scope of the invention herein involved, it is intended that all matter contained in the above description shall be interpreted as illustrative and not in a limiting sense.

What is claimed is:

1. The method of growing a silicon carbide epitaxial layer on a silicon carbide seed crystal which comprises:

providing a silicon carbide seed crystal surface which contacts a carbon surface which may or may not be wetted with silicon, wetting said carbon surface with silicon prior to said contacting step or subsequent thereto, such that said silicon exists as a layer between said seed crystal surface and said carbon surface, providing a temperature gradient between said seed crystal surface and said carbon surface with said carbon surface being hotter, maintaining the temperature of said seed crystal and said wetted carbon surface sufficiently high such that said layer of silicon is molten, whereby there is solution of carbon at said carbon surface and epitaxial deposition of silicon carbide on said seed crystal surface.

2. The method of claim 1 wherein said silicon carbide seed crystal is of one conductivity type and said silicon contains an impurity of opposite conductivity type whereby said epitaxial deposit is of opposite conductivity type.

3. The method of claim 2 wherein said impurity of opposite conductivity is a "p" type impurity.

4. The method of claim 3 wherein the "p" type impurity is boron.

5. The method of claim 3 wherein the "p" type impurity is aluminum.

References Cited

UNITED STATES PATENTS

| | | | |
|---|---|---|---|
| 2,937,324 | 5/1960 | Kroko | 23—208 |
| 3,205,101 | 9/1965 | Mlavsky et al. | 148—171 |
| 3,301,716 | 1/1967 | Kleinknecht | 148—1.5 |
| 3,411,946 | 11/1968 | Tramposch | 148—1.6 |

L. DEWAYNE RUTLEDGE, Primary Examiner

PAUL WEINSTEIN, Assistant Examiner

U.S. Cl. X.R.

23—208; 117—201; 148—1.5, 1.6, 173, 177